(12) United States Patent
Blessing et al.

(10) Patent No.: US 7,717,434 B2
(45) Date of Patent: May 18, 2010

(54) SEALING SYSTEM

(75) Inventors: Adrian Blessing, Metzingen (DE);
Werner Schönherr, Selters (DE)

(73) Assignee: ElringKlinger AG, Dettingen/Erms (DE)

( * ) Notice: Subject to any disclaimer, the term of this patent is extended or adjusted under 35 U.S.C. 154(b) by 195 days.

(21) Appl. No.: 11/453,145

(22) Filed: Jun. 15, 2006

(65) Prior Publication Data

US 2007/0013148 A1  Jan. 18, 2007

(30) Foreign Application Priority Data

Jul. 16, 2005  (DE)  ........................ 10 2005 033 387

(51) Int. Cl.
*F16L 17/06* (2006.01)
*F16L 21/02* (2006.01)

(52) U.S. Cl. ........................ 277/608; 277/609; 277/616; 277/637; 277/644

(58) Field of Classification Search .................. 277/606, 277/608–609, 616, 625, 630, 637, 640–641, 277/644, 647
See application file for complete search history.

(56) References Cited

U.S. PATENT DOCUMENTS

| | | | | |
|---|---|---|---|---|
| 2,701,150 A | * | 2/1955 | Hornell | 277/376 |
| 3,332,141 A | * | 7/1967 | Hopp | 29/520 |
| 3,537,733 A | * | 11/1970 | Martin | 285/332.3 |
| 3,709,572 A | * | 1/1973 | Pethis | 277/376 |
| 4,056,682 A | * | 11/1977 | Havens et al. | 174/371 |
| 4,241,491 A | * | 12/1980 | Hopp | 29/511 |
| 4,241,895 A | * | 12/1980 | Sternenberg et al. | 251/173 |
| 4,277,047 A | * | 7/1981 | Zinnai | 251/362 |
| 4,744,572 A | * | 5/1988 | Sahba et al. | 277/641 |
| 6,250,645 B1 | * | 6/2001 | Udagawa | 277/595 |
| 6,814,358 B2 | * | 11/2004 | Keck | 277/638 |
| 7,063,329 B2 | * | 6/2006 | Anderson et al. | 277/626 |

FOREIGN PATENT DOCUMENTS

| | | |
|---|---|---|
| DE | 36 10 541 | 10/1987 |
| DE | 101 07 939 | 8/2002 |
| JP | 2002-243042 | 8/2002 |

* cited by examiner

*Primary Examiner*—Vishal Patel
(74) *Attorney, Agent, or Firm*—Roylance, Abrams, Berdo & Goodman, L.L.P.

(57) ABSTRACT

A sealing system has a gasket (25) which in the undeformed state can be placed against a component (1) to be sealed. In the deformed state, the gasket engages the component (1) such that the gasket (25) is captively held on the component (1).

8 Claims, 4 Drawing Sheets

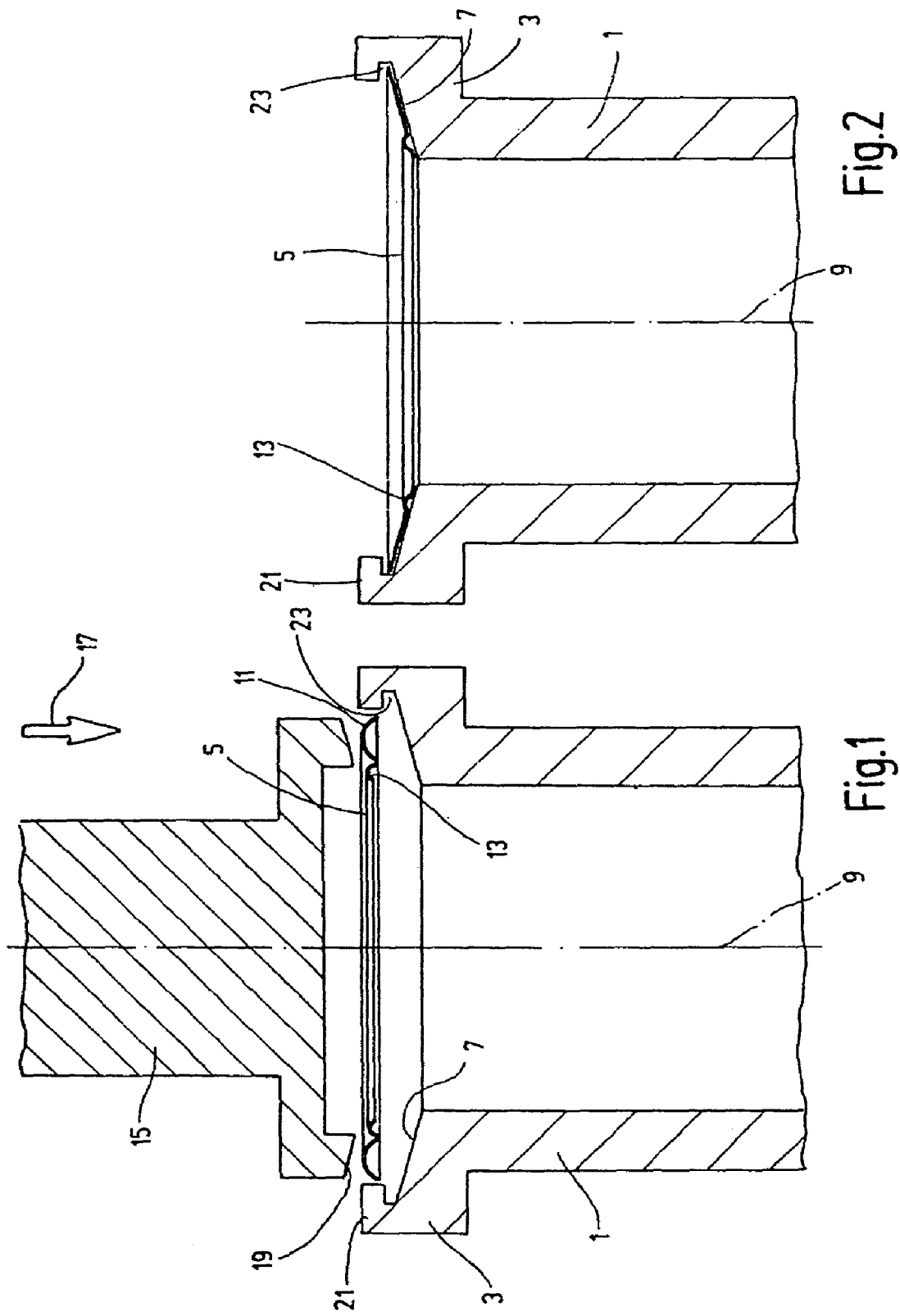

SEALING SYSTEM

FIELD OF THE INVENTION

The present invention relates to a sealing system with a gasket that can be placed against an assigned component to form a seal on it.

BACKGROUND OF THE INVENTION

In industrial production processes, with respect to achieving a high-speed and efficient operating sequence, it is prior art to use prefabricated components for assembly or installation activities. Thus, for example, in the production of systems that enclose or relay flowable media and in which seals on components are necessary, components on which the pertinent gasket has already been placed are often made available for final installation processes. A component premounted in this way promotes simple, high-speed and efficient execution of a subsequent, final installation process, but complication of the working step of transfer between the premounted component and final assembly station must be tolerated. In this connection the premounted component must be handled such that the danger of the gasket falling off the component or being lost in the transfer phase is avoided.

SUMMARY OF THE INVENTION

An object of the present invention is to provide a sealing system in which a gasket placed on a pertinent component is captively locked on it.

This object is basically achieved according to the present invention by a sealing system that has a gasket made such that, after it is placed against a pertinent component, it captively engages it by deformation. By a simple premounting process in which action is applied to the gasket by deformation, the gasket is held "captively" on the component until complete installation. The component can then be handled after premounting without the need for measures to keep the gasket on the component in the transition phase.

In advantageous exemplary embodiments in which the gasket is designed to form an axial seal and surrounds the longitudinal axis along one contact surface with the component, preferably, at least one material gasket part is made such that in the undeformed state it projects in the axial direction and defines a first radial distance of the edge area of the gasket from the longitudinal axis, and that in the deformed state it is flattened and brought near the contact surface and defines a second radial distance from the longitudinal axis.

In an especially simple and advantageous manner in these exemplary embodiments, deformation takes place by simply pressing the gasket flat, for example, by a plunger which presses the gasket flat on the contact surface.

As the material part projecting in the axial direction in the undeformed state, at least one bead can extend along the edge of the gasket and can be pressed flat as the gasket passes into the deformed state to change the radial distance of the outside periphery or of the inner edge of the gasket from the longitudinal axis.

Alternatively, the material part projecting out of the main plane of the gasket in the undeformed state can be at least one retaining projection located on the edge of the gasket and raised obliquely in the undeformed state out of the main plane of the seal. Preferably, several obliquely raised retaining projections are distributed along the outside peripheral edge of the gasket.

Alternatively, these retaining projections can be arranged and distributed around the inside edge of the gasket.

As the retaining means on the component which the pertinent gasket engages by deformation, the component can have a flange forming the contact surface for the gasket. On the peripheral edge of the flange, an enclosure protrudes axially from the contact surface, and has an undercut which is opened radially to the inside and which the gasket engages with the material part increasing its radial distance from the longitudinal axis during deformation.

In gaskets in which the radial distance from the longitudinal axis is reduced upon deformation on the inner edge of the gasket, the contact surface with the component can form an axially protruding inner enclosure for the gasket. The inner enclosure has an undercut that is opened radially to the inside. The gasket engages with the material part which reduces its radial distance from the longitudinal axis during deformation.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 1 is a side elevational view in section of a component to be sealed with a flange that has a contact surface for a gasket, with the gasket being shown in the undeformed state before it is placed against the contact surface and with a deformation device in the form of a movable plunger being shown before moving up to the gasket, according to a first embodiment of the present invention;

FIG. 2 is a side elevational view in section of the component of FIG. 1 with a deformed gasket located on the contact surface;

DETAILED DESCRIPTION OF THE INVENTION

Figure 3:
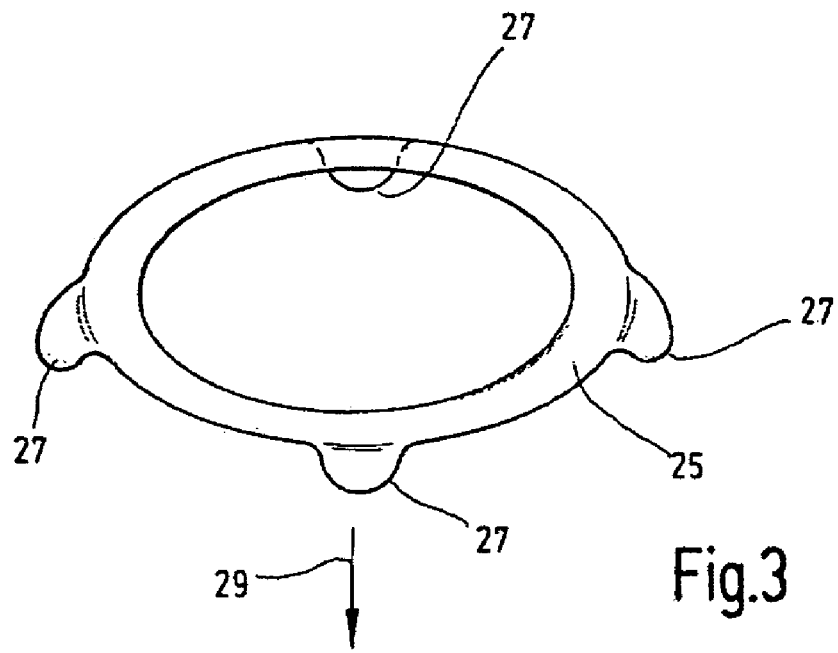
FIG. 3 is a perspective view of a gasket according to a second embodiment of the sealing system of the present invention, which has been modified compared to FIGS. 1 and 2.

FIG. 1 shows the end section of a pipeline 1 with a flange 3. The line 1 is to be connected to a continuing system component (not shown) with formation of a seal. The pipeline 1 can be, for example, the exhaust gas line in conjunction with the turbocharger system of an internal combustion engine. Such component is sealed with consideration of the high temperature of the flowing medium (exhaust gas), preferably by a gasket of metallic material. FIG. 1 shows a unitary, one-piece gasket 5 of ordinary metallic sealing material suitable for these sealing purposes. The gasket 5 is shown before it is placed against the pertinent seal contact surface 7 which, like the gasket, surrounds a central longitudinal axis 9.

FIG. 1 shows the gasket 5 in the undeformed state. The gasket 5, along its outer peripheral edge, has a material part in the form of a larger bead 11 surrounding a smaller bead 13 lying radially farther to the inside.

FIG. 2 shows the gasket 5 in the "installed" state. The gasket 5 is deformed by the bead 11 being pressed flat. Deformation takes place by a plunger 15 shown in FIG. 1. Plunger 15 is moved in the direction of the arrow 17 so that its pressing surface 19 pushes the gasket 5 against the contact surface 7 and, in doing so, presses the bead 11 flat. While in the undeformed state, the outer peripheral edge of the gasket 5 is spaced a first radial distance from the longitudinal axis 9 enabling it to adjoin the contact surface 7. An access opening on the flange 3 is bordered by an outer enclosure 21 projecting axially out of or from the contact surface 7. The outside diameter of the gasket 5 is enlarged by pressing the bead 11 flat to such an extent (see FIG. 2) that the gasket 5 is prevented from being lifted out of the flange 3 axially by the enclosure 21. This enclosure 21 has an undercut 23 opening radially inwardly, being closed in axial directions, adjoining the contact surface 7 and engaging the peripheral edge of the deformed gasket 5 spaced a second distance, larger than the first distance from the longitudinal axis 9, so that it is locked captively in the undercut of the flange 3 of the line 1 by the enclosure 21 which forms a retaining means.

Figure 4:
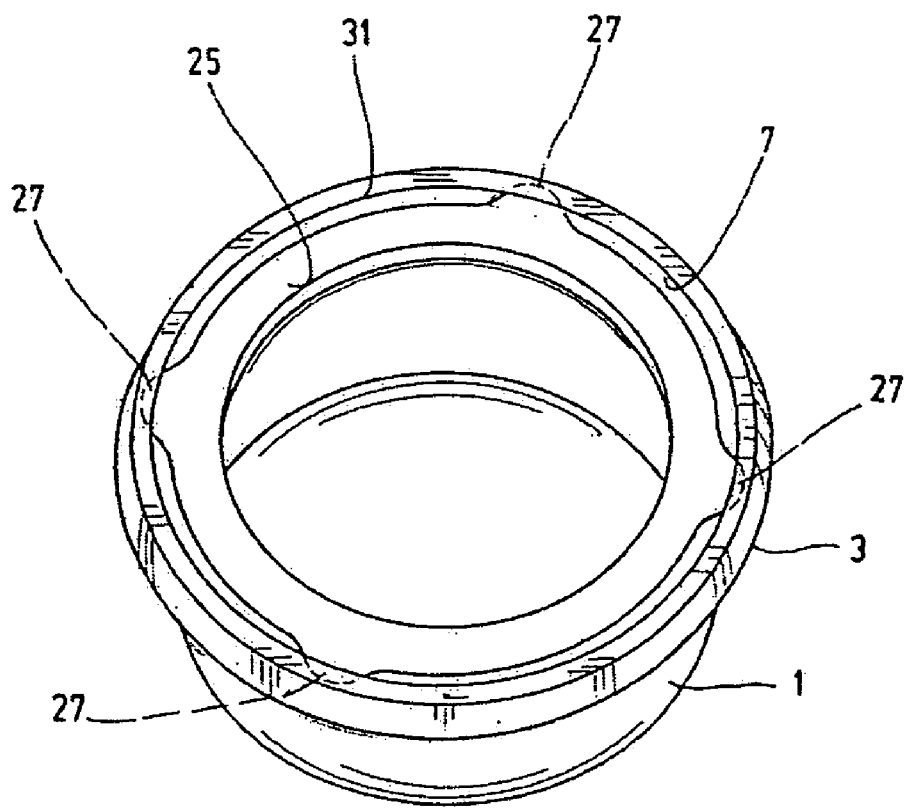
FIG. 4 is a perspective view of a sealing system using the gasket of FIG. 3, the gasket being shown captively locked on the component in the deformed state.

FIGS. 3 and 4 show one modified example or a second embodiment of the present invention, with a metallic gasket 25. Instead of a bead provided as a deformable material part, four retaining projections 27 are molded on, have a rounded shape, are raised axially obliquely out of the main seal plane, and are distributed on the outside peripheral edge of the gasket 25. FIG. 3 shows the gasket 25 in the undeformed state before it is brought (in the direction of the arrow 29) into engagement with the flange 3 of the pipeline 1 to be sealed. Instead of the external enclosure 21 on the flange 3 with the undercut 23 made in the enclosure 21, shown in FIG. 1 and FIG. 2, on the flange 3 of the example or embodiment of FIG. 4 the peripheral edge of the flange 3 is provided to the inside with a slight border 31 forming an undercut with the seal contact surface 7. The gasket 25 in the undeformed state can be placed against the contact surface 7 through the inside edge of the border 31. The retaining projections 27 engage in the undercut under the border 31 as soon as the gasket 25 is deformed by pressing flat, by which the retaining projections 27 widen to the outside when pressure is applied to the contact surface 7 (FIG. 4).

Figure 5:
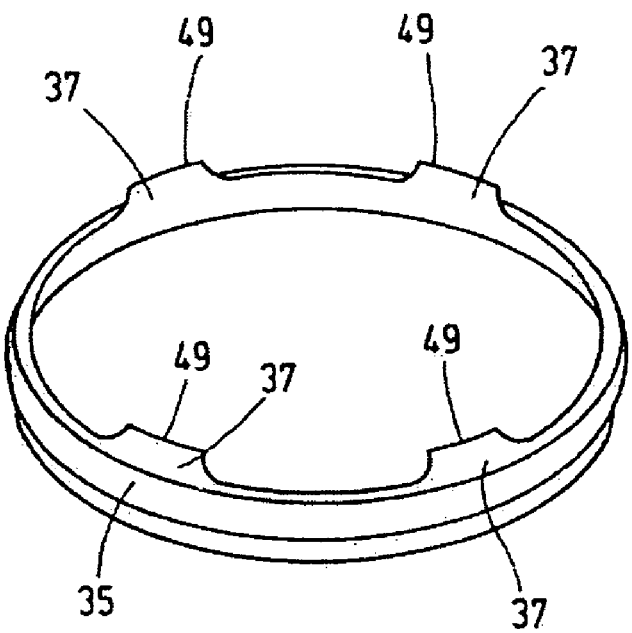
FIG. 5 is a perspective view of a gasket according to a third exemplary embodiment of the sealing system of the present invention.
Figure 6:
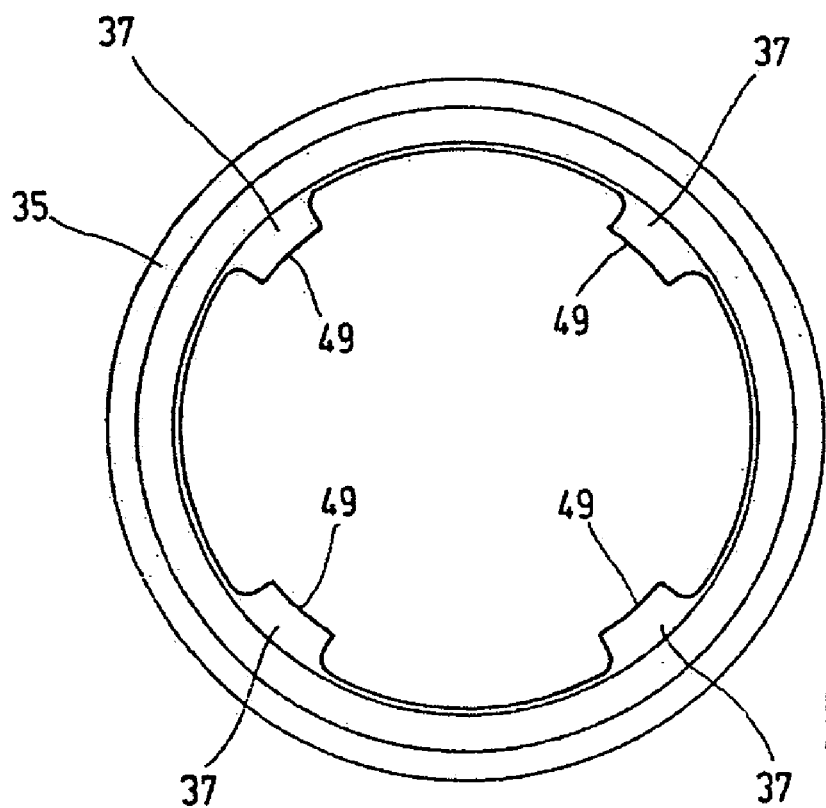
FIG. 6 is a top plan view of the gasket of FIG. 5 in its deformed state.
Figure 8:
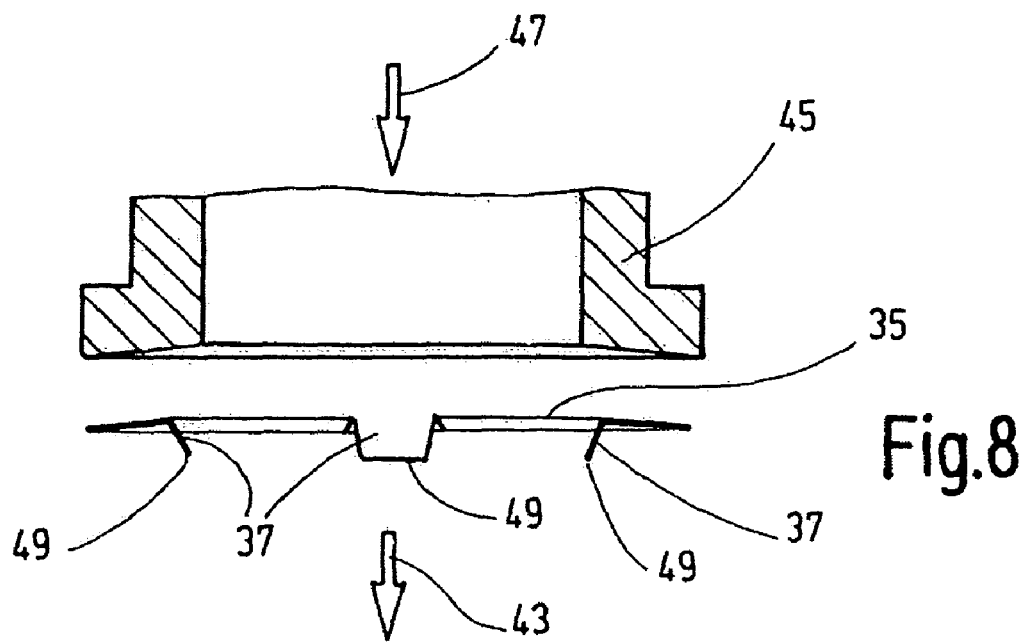
FIG. 8 is a side elevational view in section of the gasket from FIGS. 5 and 6 in the undeformed state, before being placed against the component and before deformation by the hollow plunger.
Figure 7:
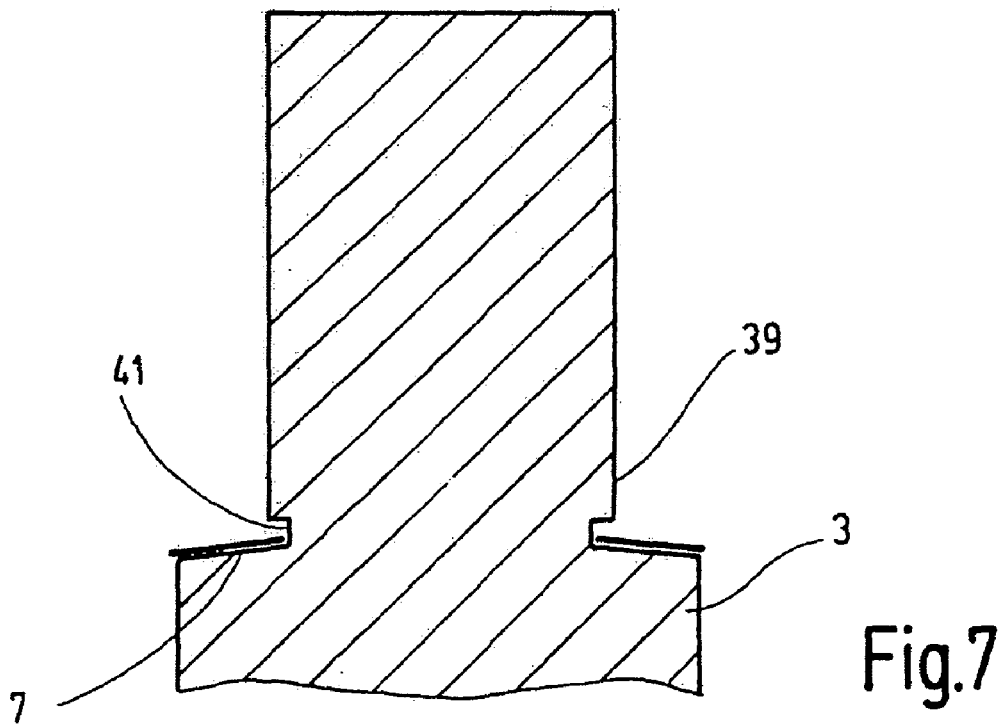
FIG. 7 is a side elevational view in section of a sealing system of the present invention with the gasket of FIGS. 5 and 6 in the deformed state and captively locked.

FIGS. 5 and 6 show a gasket 35 made likewise from metallic material for a modified or third embodiment. FIG. 5 shows the gasket 35 in the undeformed state. FIG. 6 shows the deformed state of the gasket 35. In contrast to the example from FIGS. 3 and 4, retaining projections 37 are obliquely raised out from the gasket plane in a distributed arrangement on the inside edge of the gasket 35. FIGS. 7 and 8 illustrate the application principle of the gasket 35. FIG. 7 shows the seal contact surface 7 on the flange 3 of the component to be sealed. The inner edge of the contact surface 7 has an enclosure 39 in which an undercut 41, opening radially outwardly and closed in both axial directions, adjoins the inside edge of the contact surface 7. FIG. 8 shows the undeformed gasket 35 before moving to the contact surface 7 (FIG. 7) in the direction of the arrow 43 and before moving the deforming pipe plunger 45 in the direction of the arrow 47. In the undeformed state the end edges 49 of the retaining projections 37 have a radial distance from the longitudinal axis such that the gasket 35 can be pushed over the enclosure 39. Upon the retaining projections 37 being placed flat against the contact surface 7 by the plunger 45, the end edges 49 of the retaining projections 37 extend into the undercut 41 of the enclosure 39 so that the gasket 35 is in turn captively locked axially. As is most apparent from FIG. 6, the end edges 49 of the retaining projections 37 are not rounded, as is the case for the end edges 49 of the retaining projections 27 of FIGS. 3 and 4, but run or extend along arc segments relative to the longitudinal axis.

While various embodiments have been chosen to illustrate the invention, it will be understood by those skilled in the art that various changes and modifications can be made therein without departing from the scope of the invention as defined in the appended claims.

What is claimed is:

1. A sealing system, comprising:
 a component to be sealed having a longitudinal axis, a radially extending flange, an axially facing contact surface on said flange extending radially relative to said longitudinal axis, and an enclosure on an outer peripheral edge of said flange and protruding axially parallel to said longitudinal axis from said contact surface, said enclosure having an undercut opening radially inwardly toward said longitudinal axis and being closed in axial directions of said longitudinal axis; and
 a unitary, one-piece gasket forming an axial seal on said component surrounding said longitudinal axis and engaging said contact surface, said gasket having first bead and second beads as material parts thereof, said second bead being concentric with said first bead relative to said longitudinal axis and being smaller than said first bead in length and width, said first bead being movable between an undeformed state in which said first bead projects in an axial direction with a first radial distance of an edge area of said gasket from said longitudinal axis and a deformed state in which said first bead is pressed flat toward said contact surface with said edge area at a second radial distance from said longitudinal axis, said second radial distance being greater than said first radial distance such that said edge area is outside said undercut in said undeformed state to allow mounting of said gasket on said component and is engaged in said undercut in said deformed state to hold said gasket captively on said component against axial disengagement from said component.

2. The sealing system according to claim 1, wherein said second bead is radially within the first bead.

3. The sealing system according to claim 1, wherein said first and second beads extend axially from a remainder of said gasket from a same side and in a same axial direction.

4. The sealing system according to claim 2, wherein in said deformed state, said second bead remains unflattened.

5. The sealing system according to claim 1, wherein in said deformed state, said second bead remains unflattened.

6. A sealing system, comprising:
 a component to be sealed having a longitudinal axis, a radially extending flange, an axially facing contact surface on said flange extending radially relative to said longitudinal axis, and an enclosure protruding axially parallel to said longitudinal axis from said contact surface, said enclosure having an undercut opening radially relative to said longitudinal axis and being closed in axial directions of said longitudinal axis; and a unitary, one-piece gasket forming an axial seal on said component surrounding said longitudinal axis and engaging said contact surface, said gasket having first and second beads as material parts thereof, said second bead being concentric relative to said longitudinal axis with said first bead and being smaller in length and width than the first bead, said first bead being movable between an undeformed state in which said first bead projects in an axial direction with a first radial distance of an edge area of said gasket from said longitudinal axis and a deformed state in which said first bead is pressed flat toward said contact surface with said edge area at a second radial distance from said longitudinal axis, said first and second radial distances being different such that said edge area is outside said undercut in said undeformed state to allow mounting of said gasket on said component and is engaged in said undercut in said deformed state to hold said gasket captively on said component against axial disengagement from said component.

7. The sealing system according to claim 6, wherein
said enclosure is on an outer peripheral edge of said flange; and
said undercut opens radially inwardly relative to said longitudinal axis.

8. The sealing system according to claim 6, wherein
said enclosure extends axially along said longitudinal axis from a radially inner portion of said contact surface; and
said undercut opens radially outwardly relative to said longitudinal axis.

* * * * *